United States Patent
Cai et al.

(10) Patent No.: US 8,638,706 B2
(45) Date of Patent: Jan. 28, 2014

(54) METHOD AND APPARATUS FOR SCHEDULING AND SYNCHRONIZING A MULTIMEDIA BROADCAST/MULTICAST SERVICE

(75) Inventors: Zhijun Cai, Euless, TX (US); Robert M. Harrison, Grapevine, TX (US)

(73) Assignee: Motorola Mobility LLC, Libertyville, IL (US)

( * ) Notice: Subject to any disclaimer, the term of this patent is extended or adjusted under 35 U.S.C. 154(b) by 1432 days.

(21) Appl. No.: 12/115,725

(22) Filed: May 6, 2008

(65) Prior Publication Data

US 2008/0205322 A1    Aug. 28, 2008

Related U.S. Application Data

(62) Division of application No. 11/318,976, filed on Dec. 27, 2005, now abandoned.

(60) Provisional application No. 60/641,503, filed on Jan. 5, 2005.

(51) Int. Cl.
    *H04H 20/71*    (2008.01)
(52) U.S. Cl.
    USPC ........................... 370/312; 370/350; 455/436
(58) Field of Classification Search
    USPC ......... 370/312, 324, 328–329, 335–336, 342, 370/345, 350, 498, 503–504, 507, 509, 370/512; 455/436–439, 440, 442
    See application file for complete search history.

(56) References Cited

U.S. PATENT DOCUMENTS

| | | | | |
|---|---|---|---|---|
| 7,283,815 | B2 * | 10/2007 | Kim et al. | 455/423 |
| 7,321,589 | B2 * | 1/2008 | Lohr et al. | 370/394 |
| 7,450,545 | B2 * | 11/2008 | Kim et al. | 370/331 |

(Continued)

FOREIGN PATENT DOCUMENTS

| | | | |
|---|---|---|---|
| EP | 0335846 | B1 | 3/1993 |
| EP | 0522774 | B1 | 12/1996 |

(Continued)

OTHER PUBLICATIONS

3GPP TS 25.346 v6.3.0 (Dec. 2004), 3rd Generation Partnership Project; Technical Specification Group Radio Access Network; Introduction of the Multimedia Broadcast Multicast Service (MBMS) in the Radio Access Network(RAN); Stage 2, (Release 6), pp. 1-55.

(Continued)

*Primary Examiner* — Kevin Mew

(57) ABSTRACT

A communication system provides, via a single, serving Node B, scheduling information required by a user equipment (UE) to determine a start time for each Node B of multiple Node Bs with respect to a multicast, by each Node B of the multiple Node Bs, of soft combinable MBMS data. The UE may then use the scheduling information to synchronize a soft combining of the MBMS data received by the UE via each of the multiple Node Bs, even when the multicasts via the multiple Node Bs are not synchronized. However, while the multicasts of frames of data associated with an MBMS service by different Node Bs need not be synchronized, synchronized multicasts are preferable for soft combining. Therefore, the communication system further provides for a synchronization by a network controller of the multicasts of the soft combinable MBMS data by the multiple Node Bs.

18 Claims, 8 Drawing Sheets

(56) References Cited

U.S. PATENT DOCUMENTS

| | | | |
|---|---|---|---|
| 7,509,127 B2* | 3/2009 | Wang et al. | 455/439 |
| 7,583,977 B2* | 9/2009 | Willenegger et al. | 455/522 |
| 7,593,746 B2* | 9/2009 | Willenegger et al. | 455/522 |
| 7,620,061 B2* | 11/2009 | Yi et al. | 370/432 |
| 7,664,070 B2* | 2/2010 | Van Dervelde et al. | 370/329 |
| 7,675,891 B2* | 3/2010 | Lindoff et al. | 370/338 |
| 7,773,556 B2* | 8/2010 | Jung et al. | 370/328 |
| 7,821,979 B2* | 10/2010 | Lee et al. | 370/312 |
| 7,860,107 B2* | 12/2010 | Legg | 370/395.4 |
| 8,068,465 B2* | 11/2011 | Zhang et al. | 370/335 |
| 8,194,579 B2* | 6/2012 | Lee et al. | 370/312 |
| 8,223,689 B2* | 7/2012 | Fischer | 370/328 |
| 2001/0034233 A1 | 10/2001 | Tiedemann, Jr. et al. | |
| 2004/0008646 A1 | 1/2004 | Park et al. | |
| 2004/0105402 A1 | 6/2004 | Yi et al. | |
| 2004/0228301 A1* | 11/2004 | Rudolf et al. | 370/329 |
| 2004/0229624 A1* | 11/2004 | Cai et al. | 455/449 |
| 2005/0249140 A1* | 11/2005 | Lee et al. | 370/312 |
| 2005/0282569 A1* | 12/2005 | Kim et al. | 455/502 |
| 2006/0013168 A1* | 1/2006 | Agrawal et al. | 370/335 |
| 2006/0067281 A1* | 3/2006 | Kwak et al. | 370/337 |
| 2006/0098676 A1* | 5/2006 | Cai et al. | 370/432 |
| 2006/0146779 A1* | 7/2006 | Lee et al. | 370/345 |
| 2007/0135153 A1* | 6/2007 | Cai et al. | 455/522 |
| 2007/0183358 A1* | 8/2007 | Cai | 370/328 |
| 2007/0190997 A1* | 8/2007 | Moon et al. | 455/422.1 |
| 2008/0101326 A1* | 5/2008 | Zhang et al. | 370/345 |
| 2011/0149829 A1* | 6/2011 | Terry | 370/312 |

FOREIGN PATENT DOCUMENTS

| | | |
|---|---|---|
| EP | 0845877 A2 | 6/1998 |
| EP | 0777395 B1 | 3/2006 |
| EP | 1372350 B1 | 9/2006 |
| JP | H06334593 A | 12/1994 |
| JP | 2004166209 | 6/2004 |
| WO | 9430024 | 12/1994 |
| WO | 9508899 | 3/1995 |
| WO | 9618277 | 6/1996 |

OTHER PUBLICATIONS

3GPP TS 25.402 v.5.3.0 (Dec. 2003), 3rd Generation Partnership Project; Technical Specification Group Radio Access Network; Synchronisation in UTRAN Stage 2, (Release5), pp. 1-47.

Motorola: "Requirements for soft combining macro diversity for MBMS", 3GPP Draft; R2-041369-Soft-Combining, 3rd Generation Partnership Project (3GPP), Mobile Competence Centre; 650, Route Des Lucioles; F-06921 Sophia-Antipolis Cedex; France, vol. RAN WG2, No. Cannes, France, all pages.

Government of India Patent Office, Sector V, Salt Lake City, Kolkata, First Examination Report, Feb. 7, 2013, all pages.

3GPP TSG RAN2 MBMS adhoc, R2-040756, "MBMS: Requirements for the Scheduling message", Samsung, Budapest, Hungary, Apr. 20-24, 2004, 3 pages.

3GPP TSG RAN WG2, TSGR#43 (04)1724, "Performance Benefits from TFCI with MBMS traffic", Motorola, Prague, Czech Republic, Aug. 16-20, 2004, 3 pages.

* cited by examiner

METHOD AND APPARATUS FOR SCHEDULING AND SYNCHRONIZING A MULTIMEDIA BROADCAST/MULTICAST SERVICE

CROSS-REFERENCE TO RELATED APPLICATION

This application claims priority from provisional U.S. patent application Ser. No. 60/641,503, entitled "METHOD AND APPARATUS FOR SCHEDULING AND SYNCHRONIZING A MULTIMEDIA BROADCAST/MULTICAST SERVICE," and filed Jan. 5, 2005, and is divisional of U.S. patent application Ser. No. 11/318,976, entitled "METHOD AND APPARATUS FOR SCHEDULING AND SYNCHRONIZING A MULTIMEDIA BROADCAST/MULTICAST SERVICE," and filed Dec. 27, 2005, which applications are commonly owned and incorporated herein by reference in their entirety.

FIELD OF THE INVENTION

The present invention relates generally to wireless packet data communication systems, and, in particular, to scheduling and synchronization of a multimedia broadcast/multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that user equipment (UEs) operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.344 (Third Generation Partnership Project Technical Specification 25.344) v0.5.0, 3GPP TS 23.246 v1.1.0, 3GPP TS 23.846 v6.1.0, 3GPP TS 25.331 v5.6.0, and 3GPP TS 25.346 v6.3.0, for a provision of a Multimedia Broadcast/Multicast Service (an MBMS service) by a UMTS communication system to UEs serviced by the system and subscribed to the service. The MBMS service provides for a multicast of MBMS data, typically in a format of Internet Protocol (IP) data packets, to the subscribed UEs. In order to ensure that the air interface resources of the UMTS communication system are not wasted, the system first estimates the number of recipients, that is subscribed UEs, in a cell providing MBMS data. Based on the estimated number of recipients, a Radio Network Controller (RNC) included in a UMTS infrastructure determines whether to establish a Point-To-Multipoint (PTM) communication channel in the cell or a Point-To-Point (PTP) communication channel to each recipient.

When the RNC determines to establish a PTM communication channel in each of multiple cells, that is, at each of multiple corresponding Node Bs, the RNC may then multicast the MBMS data via a Forward Access Channel (FACH) of each cell, which FACH is mapped to a Secondary Common Control Physical Channel (S-CCPCH) of the cell. A UE receiving a same MBMS data stream via the S-CCPCH of each of the multiple Node Bs may then combine the data streams. By combining a data stream received from each of multiple Node Bs, significant system gain may be obtained. However, in order to obtain the benefits of soft combining, the UE must be able to synchronize the MBMS data received by the UE via each Node B of the multiple Node Bs.

Therefore, a need exists for a method and apparatus that permits a UE to synchronize MBMS data received by the UE via each Node B of multiple Node Bs.

DETAILED DESCRIPTION OF THE INVENTION

Figure 1:
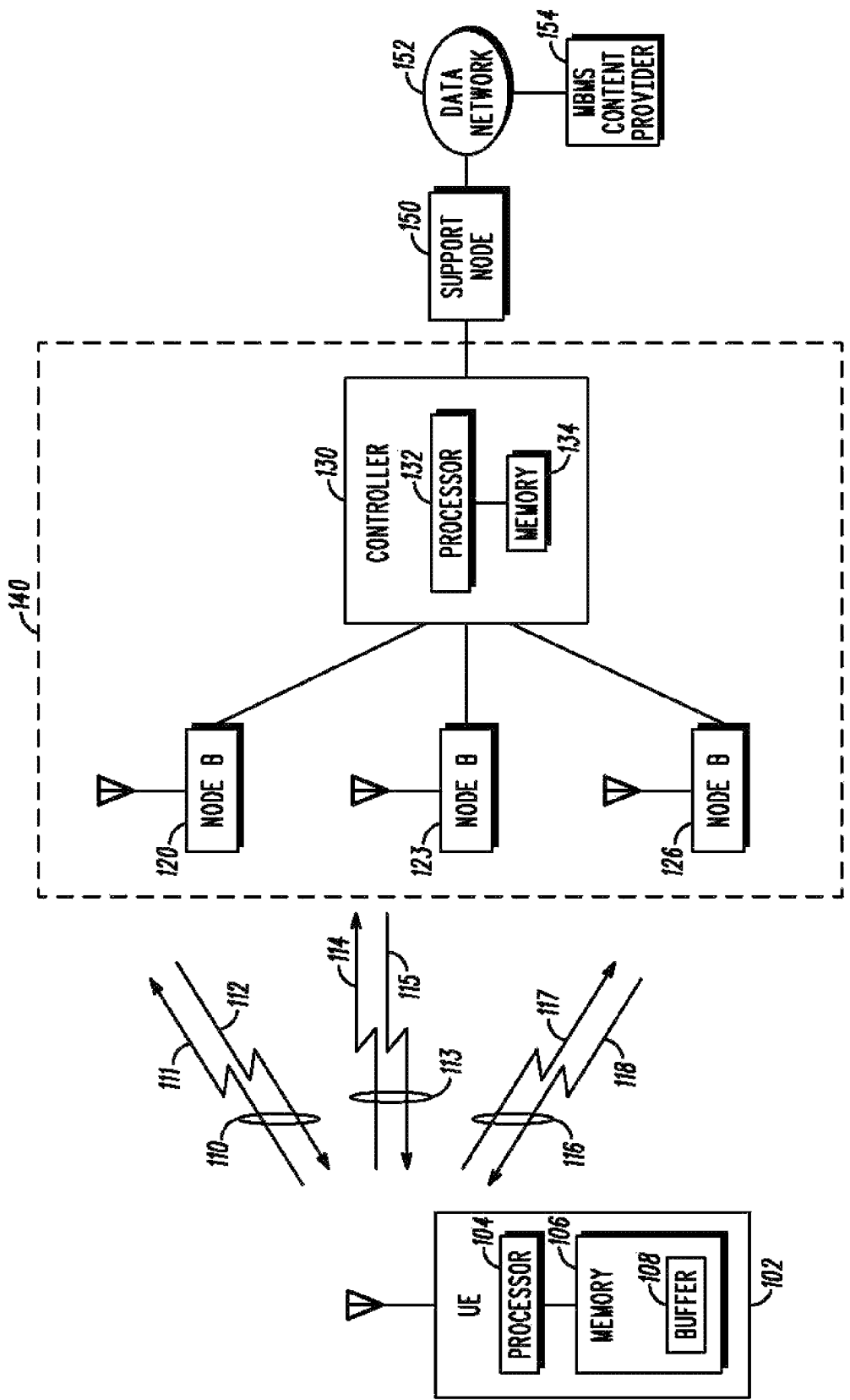
FIG. 1 is a block diagram of a wireless communication system in accordance with an embodiment of the present invention.

To address the need for a method and an apparatus that permits a UE to synchronize MBMS data received by the UE via each Node B of multiple Node Bs, a communication system provides for a provision, via a single, serving Node B, of all scheduling information required by a user equipment (UE) to determine a start time for all other Node Bs of multiple Node Bs with respect to a multicast, by each Node B of the multiple Node Bs, of soft combinable MBMS data. The UE may then use the scheduling information to synchronize a soft combining of the MBMS data received by the UE via each of the multiple Node Bs, even when the multicasts via the multiple Node Bs are not synchronized. However, while the multicasts of frames of data associated with an MBMS service by different Node Bs need not be synchronized, synchronized multicasts are preferable for soft combining. Therefore, the communication system further provides for a synchronization by a network controller of the multicasts of the soft combinable MBMS data by the multiple Node Bs.

Generally, an embodiment of the present invention encompasses a method for providing scheduling information associated with a Multimedia Broadcast/Multicast Service (MBMS service). The method includes setting up a multicast of the MBMS service at each Node B of a plurality of Node Bs and conveying scheduling information for each Node B of the plurality of Node Bs to a user equipment via a single Node B of the of the plurality of Node Bs.

Another embodiment of the present invention encompasses a method for providing scheduling information associated with a Multimedia Broadcast/Multicast Service (MBMS service). The method includes setting up a multicast of the MBMS service at each Node B of a plurality of Node Bs, wherein the plurality of Node Bs comprise a serving Node B and a neighbor Node B, determining a start time for the neighbor Node B, determining, in association with the start time, an indicator that identifies a specific time as a start time for a multicast of the MBMS service by the neighbor Node B, conveying a Transmission Time Interval (TTI) size of a transmission that may be soft combined to a user equipment via the serving Node B, and conveying the indicator to a user equipment via the serving Node B.

Still another embodiment of the present invention encompasses a method for determining a start time for a multicast of a Multimedia Broadcast/Multicast Service (MBMS service). The method includes receiving, via a serving Node B, an indicator that identifies a specific time as a start time for a multicast of the MBMS service by a neighbor Node B and a Transmission Time Interval (TTI) size and determining a start time and a TTI size for the neighbor Node B based on the received indicator and the TTI size.

Yet another embodiment of the present invention encompasses a network controller that that provides scheduling information associated with a Multimedia Broadcast/Multicast Service (MBMS service). The network controller is configured to set up a multicast of the MBMS service at each Node B of a plurality of Node Bs and convey scheduling information for each Node B of the plurality of Node Bs to a user equipment via a single Node B of the of the plurality of Node Bs.

Still another embodiment of the present invention encompasses a network controller that provides scheduling information associated with a Multimedia Broadcast/Multicast Service (MBMS service). The network controller is configured to set up a multicast of the MBMS service at each Node B of a plurality of Node Bs, wherein the plurality of Node Bs comprise a serving Node B and a neighbor Node B, determine a start time for the neighbor Node B, determine, in association with the start time, a start time indicator, wherein the start time indicator corresponds to the starting frame, convey a TTI size of a transmission that may be soft combined to a user equipment via the serving Node B, and convey the start time indicator to the user equipment via the serving Node B.

Yet another embodiment of the present invention encompasses a user equipment (UE) that operates in a wireless communication system wherein a Multimedia Broadcast/Multicast Service (MBMS service) is delivered by multicast via each Node B of a plurality of Node Bs and wherein the plurality of Node Bs comprise a serving Node B and a neighbor Node B. The user equipment determines a start time of the multicast by the neighbor Node B and is configured to determine, in association with a potential start time of an Multimedia Broadcast/Multicast Service (MBMS) transmission by the neighbor Node B, a start time indicator, receive a start time indicator that corresponds to a start time for the neighbor Node B, and determine a start time for the neighbor Node B based on the start time indicator determined by the UE and the start time indicator received by the UE.

The present invention may be more fully described with reference to FIGS. 1-8. FIG. 1 is a block diagram of a wireless communication system 100 in accordance with an embodiment of the present invention. Communication system 100 includes multiple Node Bs, 120, 123, and 126 (three shown). Each Node B 120, 123, 126 is operably coupled to a network controller 130, preferably a Radio Network Controller (RNC); however, in another embodiment of the present invention, one or more of Node Bs 120, 123, 126 may be coupled to a different network controller, wherein each such network controller is coupled to the other network controllers. When one or more of Node Bs 120, 123, and 126 is coupled to a different network controller than the other Node Bs, the references herein to network controller 130 may be deemed to collectively refer to all such network controllers, as the functions described herein may be distributed among such network controllers. Each Node B 120, 123, 126 provides wireless communication services to a corresponding coverage area, such as cell or a sector of a cell, via a respective air interface 110, 113, and 116. Together, the multiple Node Bs 120, 123, 126 and network controller 130 are collectively referred to herein as a Radio Access Network (RAN) 140.

Each air interface 110, 113, 116 comprises a respective downlink (DL) 112, 115, 118 having multiple downlink logical and transport channels, including at least one broadcast channel, at least one traffic channel, and at least one control channel, that may be mapped to one or more of multiple downlink physical channels, including at least one common control channel, at least one dedicated channel, and at least one pilot channel. Each air interface 110, 113, 116 further comprises a respective uplink (UL) 111, 114, 117 having multiple uplink logical and transport channels, including an access channel, at least one traffic channel, and at least one control channel, that may be mapped to one or more of multiple uplink physical channels.

Communication system 100 further includes at least one user equipment (UE) 102 (one shown), such as but not limited to a cellular telephone, a radio telephone, a personal digital assistant (PDA) with radio frequency (RF) capabilities, or a wireless modem that provides RF access to digital terminal equipment (DTE) such as a laptop computer. UE 102 resides in a coverage area serviced by a serving Node B, that is, Node B 123, of the multiple Node Bs. UE 102 may soft combine MBMS transmissions from one or more neighbor Node Bs in addition to serving Node B 123, such as one or more of Node Bs 120 and 126.

UE 102 subscribes to, and is capable of receiving and displaying audio, video, and/or data associated with, a Multimedia Broadcast/Multicast Service (an MBMS service) provided by communication system 100, which service provides for a distribution of MBMS data to the UE. MBMS services are described in detail in the 3GPP TS 25.344 (Third Generation Partnership Project Technical Specification 25.344) v0.5.0, 3GPP TS 23.246 v1.1.0, 3GPP TS 23.846 v6.1.0, 3GPP TS 25.331 v5.6.0, and 3GPP TS 25.346 v6.3.0, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

Communication system 100 further includes a Support Node 150 coupled to network controller 130. Support Node 150 typically includes one or more Serving GPRS Support Nodes (SGSNs) that are each coupled to one or more Gateway GPRS Support Nodes (GGSNs). However, the precise architecture of Support Node 150 is up to an operator of communication system 100 and is not critical to the present invention. Although not shown, communication system 100 may further include other well-known network elements, such as a Broadcast Multicast Service Center (BM-SC) or a Gateway.

Communication system 100 further includes an MBMS content provider 154, such as an IP multicast server, that is coupled to support node 150 via a data network 152, such as an IP network. As part of an MBMS service provided by communication system 100 and subscribed to by UE 102, MBMS content provider 154 sources MBMS data, typically in the form of IP data packets, to subscribed UE 102 via support node 150, controller 130, serving Node B 123, and one or more of neighboring Node Bs 120 and 126.

Each of UE 102 and controller 130 includes a respective processor 104, 132 such as one or more microprocessors, microcontrollers, digital signal processors (DSPs), combinations thereof or such other devices known to those having ordinary skill in the art. The particular operations/functions of processors 104 and 132, and respectively thus of UE 102 and controller 130, are determined by an execution of software instructions and routines that are stored in a respective at least one memory device 106, 134 associated with the processor, such as random access memory (RAM), dynamic random access memory (DRAM), and/or read only memory (ROM) or equivalents thereof, that store data and programs that may be executed by the corresponding processor. In order for UE 102 to soft combine MBMS transmissions from multiple Node Bs, at least one memory device 106 of UE 102 further comprises a soft combining buffer 108 that stores MBMS data received from each Node B (or "soft information") of the multiple Node Bs 120, 123, 126 until the data can be soft combined with a same MBMS data received from the other Node Bs of the multiple Node Bs.

The embodiments of the present invention preferably are implemented within UE 102 and controller 130, and more particularly with or in software programs and instructions stored in the respective at least one memory device 106, 134, and executed by respective processors 104, 132. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the wireless communication devices UE 102 and transceiver 123. Based on the present disclosure, one skilled in the art will be readily capable of producing and implementing such software and/or hardware without undo experimentation.

Preferably, communication system 100 is a Universal Mobile Telecommunication Service (UMTS) communication system that operates in accordance with the 3GPP (Third Generation Partnership Project), or W-CDMA (Wideband Code Division Multiple Access), standards, which provide a compatibility standard for UMTS air interfaces and which standards are hereby incorporated herein in their entirety. The standards specify wireless telecommunications system operating protocols, including radio system parameters, call processing procedures, and provision of a broadcast-multicast service, that is, a Multimedia Broadcast/Multicast Service (MBMS), in 3GPP (Third Generation Partnership Project) TS (Technical Specification) 23.246, TS 22.146, TS 25.346, and TS 29.846, which specifications are hereby incorporated herein in their entirety. In a UMTS communication system such as communication system 100, a communication channel comprises a logical and/or a transport channel, typically an orthogonal code, that is mapped to a physical channel, typically a frequency bandwidth.

In another embodiment of the present invention, communication system 100 may be a Code Division Multiple Access (CDMA) 2000 communication system that operates in accordance with the 3GPP2 (Third Generation Partnership Project 2) standards. The 3GPP2 standards provide a compatibility standard for CDMA 2000 air interfaces (both 1× and DO) and specify wireless telecommunications system operating protocols, including radio system parameters, call processing procedures. The 3GPP2 standards further specify provision of a broadcast-multicast service, that is, a Broadcast-Multicast Service (BCMCS). BCMCSs are described in detail in the 3GPP2 (Third Generation Partnership Project Two) X.P0022, A.S00019, C.S0054 and S.R0083 specifications, which specifications are hereby incorporated herein in their entirety and copies of which may be obtained from the 3GPP2 via the Internet or from the 3GPP2 Secretariat with administrative offices at 2500 Wilson Boulevard, Suite 300, Arlington, Va. 22201 (USA). In yet other embodiments of the present invention, communication system 100 may operate in accordance with any other wireless telecommunication system, such as but not limited to a Time Division Multiple Access (TDMA) communication system, a Wireless Local Area Network (WLAN) communication system as described by the IEEE (Institute of Electrical and Electronics Engineers) 802.xx standards, for example, the 802.11, 802.15, 802.16, or 802.20 standards, or an Orthogonal Frequency Division Multiple Access (OFDM) communication system.

As noted above, UE 102 subscribes to an MBMS service provided by communication system 100. The MBMS service provides for a conveyance of MBMS data, via a multicast or a unicast communication session and typically in a format of Internet Protocol (IP) data packets, to each subscribed UE. As is known in the art, when communication system 100 has MBMS data to provide to subscribers to the MBMS service, network controller 130 may determine to establish, in each coverage area, that is, at each Node B 120, 123, 126, a Point-To-Multipoint (PTM) communication channel or a Point-To-Point (PTP) channel to each recipient in the coverage area.

When UE 102 is soft combining MBMS transmissions from multiple Node Bs, the UE maintains, in the at least one memory device 106 of the UE, an MBMS Active Set or a Neighbor List. The MBMS Active Set (or Neighbor List) comprises a cell identifier and/or one or more of a logical, transport, and/or physical channel, typically a pilot channel such as a Common Pilot Channel (CPICH), associated with serving Node B 123 and each of one or more neighbor Node Bs, such as Node Bs 120 and 126, that are engaged in soft handoff with the UE, that is, that may be simultaneously involved in a communication session with the UE and that are potential candidates for handoff or cell reselection by the UE. As part of soft handoff, UE 102 monitors the logical, transport, and/or physical channel associated with each MBMS Active Set Node B. When the UE is actively engaged in an MBMS session and receives MBMS data via two or more of the MBMS Active Set Node Bs, the UE may increase the transmission gain and reduce an error rate by soft combining MBMS data received via each of the two or more MBMS Active Set Node Bs.

Figure 2:
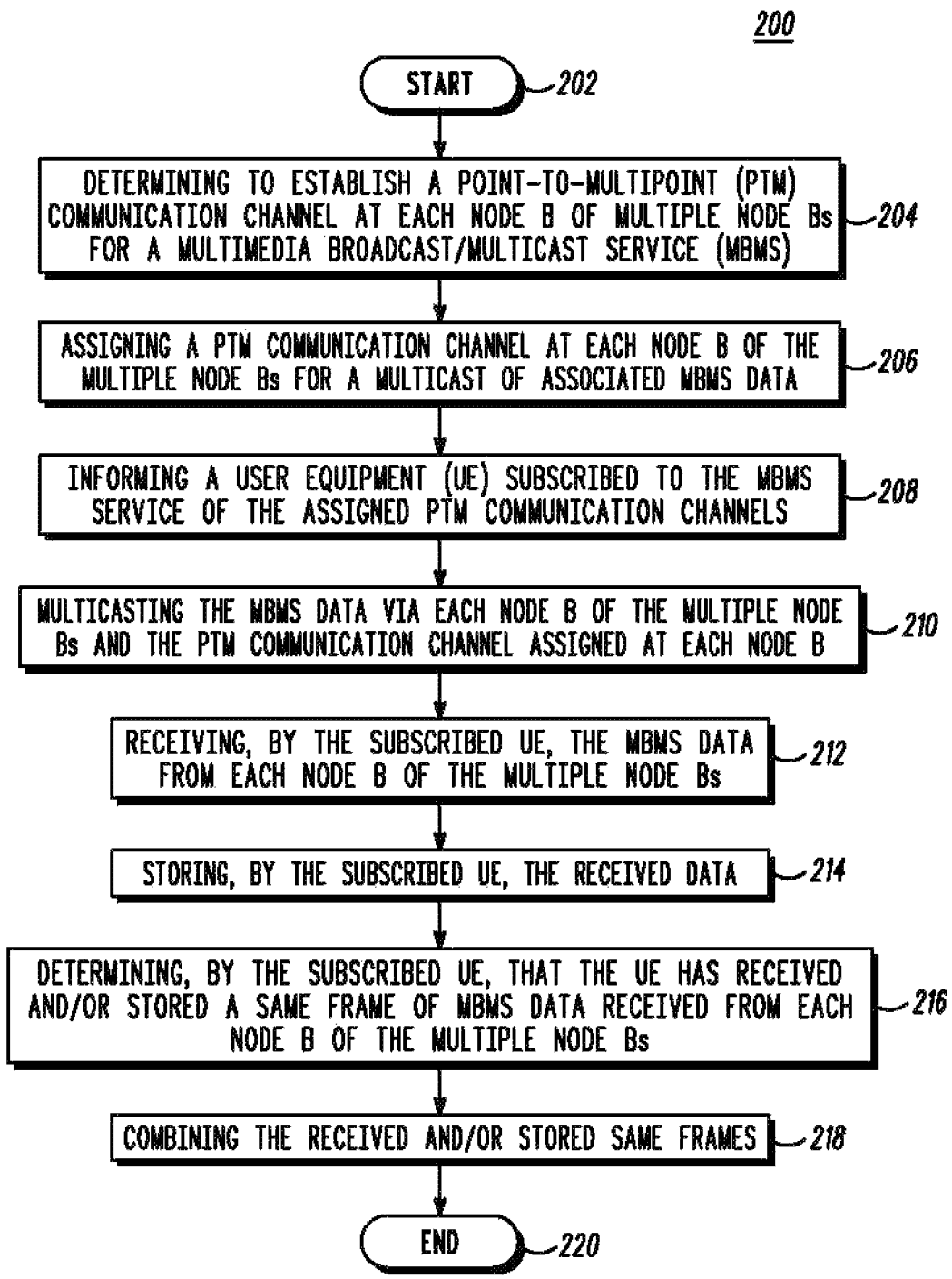
FIG. 2 is a logic flow diagram of an exemplary soft combining executed by the user equipment of FIG. 1 in accordance with an embodiment of the present invention.

Referring now to FIG. 2, a logic flow diagram 200 is provided that depicts an exemplary soft combining by UE 102 in accordance with an embodiment of the present invention. Logic flow 200 begins (202) when network controller 130 determines (204) to establish a Point-To-Multipoint (PTM) communication channel at each Node B of multiple Node Bs in the MBMS Active Set of UE 102, that is, at Node Bs 120, 123, and 126, for a provision of a same MBMS service by each such Node B (herein referred to as a soft combinable MBMS service and soft combinable Node Bs). In response to determining to establish the PTM communication channels, network controller 130 assigns (206) a PTM communication channel at each Node B 120, 123, 126 for a multicast of the data. Typically, the assigned communication channel comprises a multicast channel, such as a Forward Access Channel (FACH), that is mapped to a common physical channel, such as a Secondary Common Control Physical Channel (S-CCPCH). Network controller 130 informs (208) the subscribed UE, that is, UE 102, of the assigned PTM communication channels and then multicasts (210) the MBMS data to the UE 102 via each of Node Bs 120, 123, and 126 and the PTM communication channel assigned at each Node B. When UE 102 receives (212) the MBMS data from each Node B of the multiple Node Bs 120, 123, 126, the UE stores (214) the data in the UE's soft combining buffer 108. When the UE determines (216) that the UE has received and/or stored a same frame of MBMS data that is received via each of Node Bs 120, 123, 126 and respective downlinks 112, 115, 118, the UE combines (218) the received and/or stored same frames and logic flow 200 ends (220).

While providing a soft combinable MBMS service to UE 102, each of Node Bs 120, 123, 126 further may be provide other MBMS services to UE 102 and/or to other UEs residing in the Node B's coverage area. In turn, subscribed UE 102 may be subscribed to, and receiving, MBMS data with respect to other MBMS services from one or more of Node Bs 120, 123, and 126. In order for UE 102 to soft combine MBMS data received from each of multiple Node Bs, that is, Node Bs 120, 123, and 126, with respect to a same MBMS service, UE 102 must be able to synchronize frames of data received via each Node B, so that the UE knows, when combining frames, that a same frame of data received via each of Node Bs 120, 123, and 126 is being combined. In order for UE 102 to synchronize the frames of data, the UE must determine a start of a soft combining period with respect to transmissions from each of the Node Bs.

Figure 3:
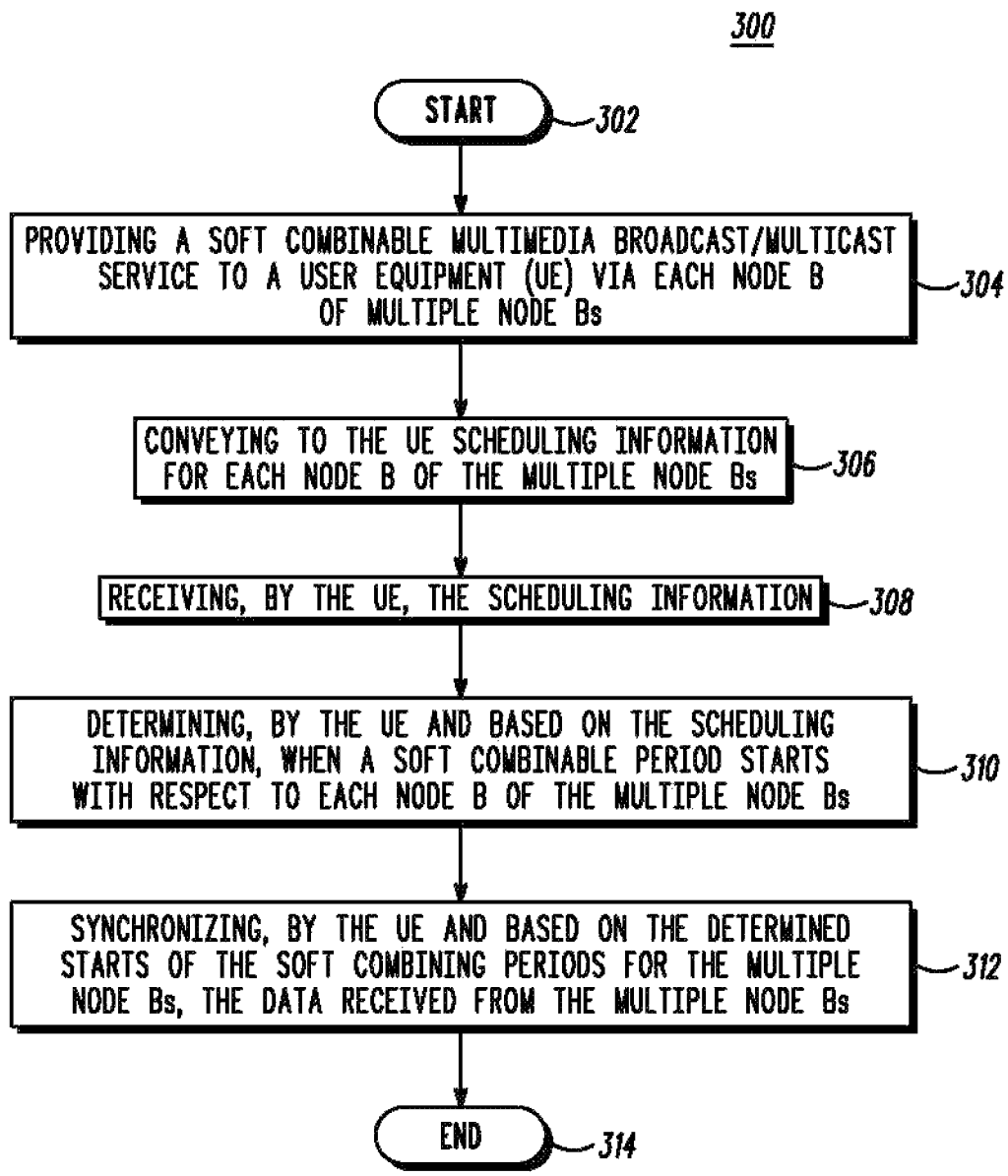
FIG. 3 is a logic flow diagram of a method by which the communication system of FIG. 1 provides scheduling information to the user equipment of FIG. 1 in accordance with various embodiments of the present invention.

To facilitate the soft combining of data by UE 102, communication system 100 provides UE 102 with scheduling information that permits the UE to determine when a soft combining period starts with respect to each of the multiple Node Bs. Referring now to FIG. 3, a logic flow diagram 300 is provided that illustrates a method by which communication system 100 provides scheduling information to UE 102 in accordance with an embodiment of the present invention. Logic flow diagram 300 begins (302) when a soft combinable MBMS service is provided (304) to UE 102 via each Node B of the multiple Node Bs, that is, Node Bs 120, 123, and 126. As part of the MBMS service, network controller 130 conveys a same frame of MBMS data to UE 102 via each of Node Bs 120, 123, and 126. When the UE receives each frame of MBMS data associated with the MBMS service from each of Node Bs 120, 123, and 126, the UE stores the data in the UE's soft combining buffer 108.

To facilitate a soft combining of the MBMS data stored by UE 102, network controller 130 further conveys (306) to UE 102, and UE 102 receives (308) from the network controller, scheduling information for each of the multiple Node Bs. Preferably, network controller 130 conveys the scheduling information via serving Node B 123 and via an MBMS control channel (MCCH) of downlink 115 of air interface 113. UE 102 may then use the provided scheduling information to determine (310) when a soft combining period starts with respect to each Node B of the multiple Node Bs 120, 123, 126 and to synchronize (312) the data received via each of the multiple Node Bs based on the determined starts of the soft combining periods for the multiple Node Bs. Logic flow 200 then ends (314).

Network controller 130 may provide scheduling information a single time per MBMS service. However, in order to provide more scheduling flexibility, network controller 130 preferably provides the scheduling information periodically. A time period for updates of scheduling information may be pre-determined, for example, every 5 seconds, and maintained in the at least one memory devices 106, 134 of UE 102 and network controller 130, or network controller 130 may transmit the time period for scheduling updates to UE 102 via the MCCH of downlink 115 of air interface 113 along with radio frequency (RF) bearer characteristics. Network controller 130 may then update the scheduling of data for an MBMS service periodically and provide the updated scheduling information to UE 102.

In one embodiment of the present invention, a 'coverage area specific,' or 'Node B specific,' embodiment, a transmission delay (or 'offset') between neighboring coverage areas, or Node Bs, is constant regardless of the MBMS service provided. As a result, the scheduling information conveyed by network controller 130 to UE 102 need not include a separate offset for each MBMS service. Instead, the scheduling information conveyed by network controller 130 to UE 102 may include a transmission delay for each neighbor Node B 120, 126 (neighbor Node B offsets) and service scheduling information for each MBMS service. In turn, the service scheduling information for each MBMS service preferably includes a reference start time for the MBMS service (preferably a start time associated with a provision of the service at serving Node B 123), preferably in units of radio frames such as a starting Cell System Frame Number (SFN) index, which varies from 0 to 4095, or a starting Connection Frame Number (CFN) index, and a scheduling duration for the service, that is, a duration of a time period during which the provided scheduling information is applicable, for example, in units of radio frames or Transmission Time Intervals (TTIs).

The transmission delay provided for each neighbor Node B corresponds to a delay in a provision of an MBMS service between a reference start time, such as the start time of the MBMS service at serving Node B 123, and the provision of the same service by the neighbor Node B. From another perspective, the transmission delay provided for each neighbor Node B comprises a delay between the start time of the MBMS service in the provided service scheduling information and a start time of the same service at the neighbor Node B. As the 'coverage area specific' embodiment assumes that transmission delay between neighboring coverage areas, or Node Bs, is constant, that is, is approximately the same regardless of the MBMS service provided, only a single delay need be provided for each neighbor Node B 120, 126 and only a single start time need be provided for each MBMS service.

In addition, when a same MBMS service is available for soft combining at the multiple Node Bs 120, 123, 126 or associated coverage areas, the scheduling period length or duration, that is, the total frames over which the scheduling information may be applicable, for each of the multiple Node Bs or coverage areas, preferably is the same. Otherwise, the delay cannot be easily controlled. That is, for soft combinable MBMS services to share a same physical channel, they must have a same scheduling period length. Therefore, preferably each soft combinable Node B 120, 123, 126 uses a same scheduling duration, and only a single scheduling duration need be provided for each MBMS service.

The transmission delays between Node Bs remain approximately constant during each scheduling period or modification period. Serving Node B 123 then may broadcast a new delay or offset information for each of the neighbor Node Bs 120, 126 each scheduling or modification period, along with new service scheduling information. Based on the service scheduling information provided with respect to each MBMS service and the offsets provided for each Node B, UE 102 is able to determine when to detect each MBMS service provided by each Node B 120, 123, 126 in each corresponding coverage area. By determining when to detect each MBMS service provided by each Node B 120, UE 102 is able to synchronize transmissions of the same information received for a same MBMS service via each of the Node Bs and to soft combine the transmissions.

In another embodiment of the present invention, a 'service specific' embodiment, the transmission delays between Node Bs may not be the same for all soft combinable MBMS services. As a result, instead of providing a delay for each neighbor Node B and a single start time and schedule duration for each MBMS service, network controller 130 may provide service scheduling information that is specific to each soft combinable MBMS service and Node B. That is, in the 'service specific' embodiment, network controller 130 conveys to UE 102, via serving Node B 123, and preferably via the MCCH of downlink 115, and for each scheduling period or modification period, service scheduling information that includes a specific start time for each soft combinable MBMS service at each Node B 120, 123, 126. Again, to facilitate soft combining, preferably each soft combinable Node B 120, 123, 126 uses a same scheduling duration. As a result, the service scheduling information may further include a specific scheduling duration for each MBMS service at each Node B 120, 123, 126 or may include only a single scheduling duration for each MBMS service.

In the 'service specific' embodiment, the transmission delays between each of the multiple Node Bs 120, 123, 126 may differ depending upon which MBMS service of multiple MBMS services is provided by all of the Node Bs. That is, a transmission delay, or offset, between start times, that is, starting radio frame numbers such as SFNs, associated with a first Node B and a second Node B in providing a first MBMS service may be different than a delay or offset between start times associated with the first Node B and the second Node B in providing a second MBMS service. However, while the delays can vary depending upon the MBMS service being provided, the delays between the start times associated with each of the MBMS services should be constrained based on the UE's soft combining buffer size. That is, the transmission delay or offset associated with each MBMS service preferably is small enough to allow UE 102 to soft combine the same MBMS data received from each of Node Bs 120, 123, 126 with a limited soft combining buffer 108 size. By constraining a maximum size of the transmission delays or offsets, a given transport block of MBMS data is transmitted on each of downlinks 112, 115, 118 within a time period such that the soft combining buffer 108 of UE 102 may store and combine the received blocks of MBMS data.

For non-soft combinable MBMS services, that is, for services that UE 102 receives via only a single Node B or coverage area of the multiple Node Bs 120, 123, 126 or associated coverage areas, each Node B or different coverage area may multicast their different MBMS services on a same S-CCPCH using different parameters, including different relative delays between the services. Such delays need not be constrained as there is no limiting size of a soft combining buffer.

Figure 4:
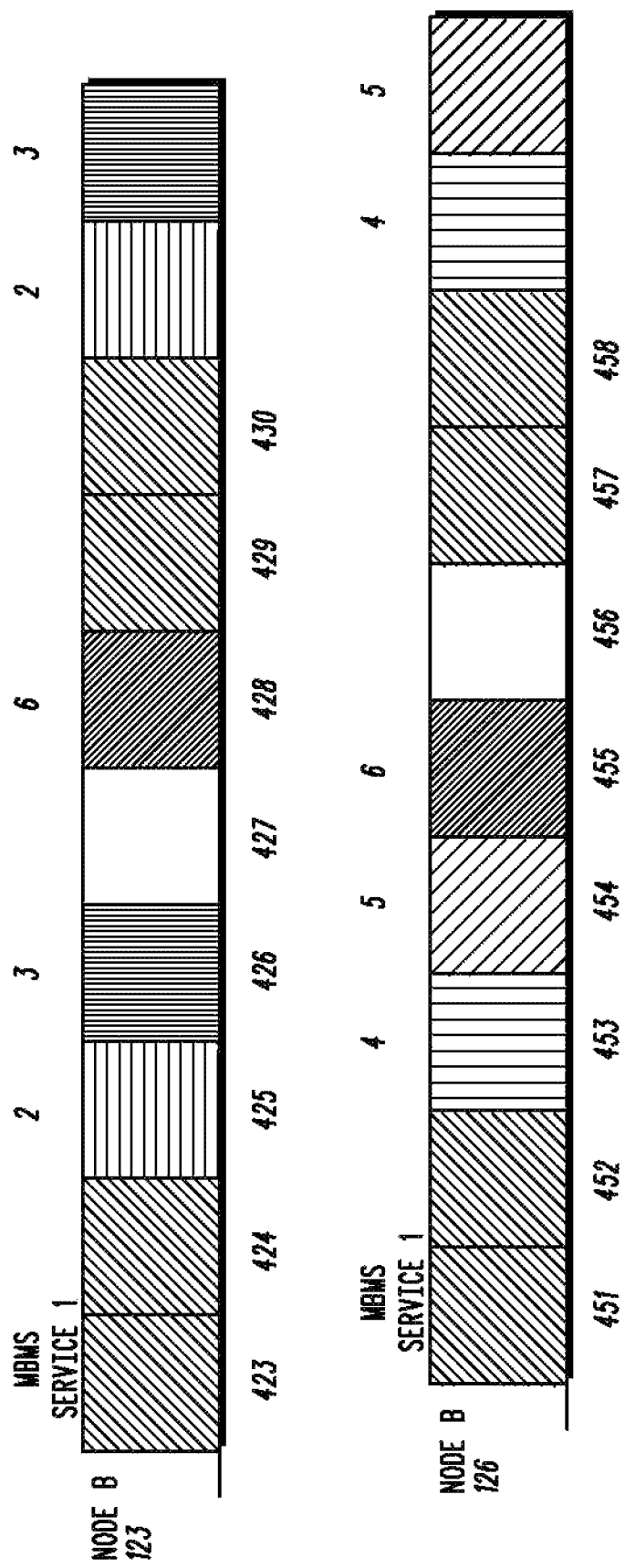
FIG. 4 is an exemplary timing diagram of frame flows associated with each of multiple Node Bs in accordance with an embodiment of the present invention.

To assist in understanding the principles of the 'service specific' embodiment while not intending to limit the invention in any way, an exemplary timing diagram 400 of frame flows for each of multiple Node Bs is provided in FIG. 4, which diagram is based on a 'service specific' scheduling of frames for a first Node B, such as Node B 123, and a second Node B, such as Node B 126. In FIG. 4, some MBMS services provided by each of the first Node B, that is, Node B 123, and the second Node B, that is, Node B 126, are soft combined by a receiving UE, that is, UE 102. For example, each of Node B 123 and Node B 126 provides MBMS services 1 and 6. Other MBMS services provided by each of Node B 123 and Node B 126 are not soft combined. For example, only Node B 123 provides MBMS services 2 and 3 and only Node B 126 provides MBMS services 4 and 5. Accordingly, when UE 102 subscribes to one or more of MBMS services 1 and 6, the UE soft combines the data received from each of Node B 123 and Node B 126, whereas when UE 102 subscribes to one or more of MBMS services 2-5 then the UE will not soft combine the MBMS data.

Furthermore, as depicted in FIG. 4, the transmission delays (or offsets) between Node B 123 and Node B 126 is not the same for all MBMS services. That is, while both Node B 123 and 126 provide both services 1 and 6, Node B 123 delivers MBMS service 1 earlier than Node B 126 while Node B 126 delivers MBMS service 6 earlier than Node B 123. Therefore, in accordance with the 'service specific' embodiment of the present invention, network controller 130 may provide to UE 102 the following scheduling information in association with Node B 123, preferably via a serving Node B (also, in this example, Node B 123):

MBMS service 1—a starting SFN of 423, a period of 6, and a transmission time interval (TTI) of 20 milliseconds (ms);

MBMS service 2—a starting SFN of 425, a period of 6, and a TTI of 20 ms;

MBMS service 3—a starting SFN of 426, a period of 6, and a TTI of 20 ms; and MBMS service 6—a starting SFN of 428, a period of 6, and a TTI of 20 ms.

In addition, network controller 130 may provide to UE 102 the following scheduling information in association with Node B 126, again preferably via serving Node B 123:

MBMS service 1—a starting SFN of 451, a period of 6, and a TTI of 20 ms;

MBMS service 4—a starting SFN of 453, a period of 6, and a TTI of 20 ms;

MBMS service 5—a starting SFN of 454, a period of 6, and a TTI of 20 ms; and MBMS service 6—a starting SFN of 455, a period of 6, and a TTI of 20 ms.

Since MBMS services 2-5 are not to be soft combined, services 2-5 may or may not be scheduled and may or may not be conveyed to the UE, as that is up to the designer of communication system 100. However, the MBMS services that are not to be soft combined cannot occupy the same TTIs as services that are to be soft combined, so a scheduling of MBMS services that are not to be soft combined may be somewhat constrained in that sense.

In both the 'coverage area specific' embodiment and the 'service specific' embodiments of the present invention, based on the scheduling information provided to UE 102, the UE can identify the different MBMS services and therefore is able to decide what to soft combine without reading a Transport Format Combination Indicator (TFCI) associated with each MBMS service and each downlink 112, 115, 118. While the TFCI may still be used by UE 102, a transport format used for a provision of the same MBMS data via each of the multiple soft combinable Node Bs 120, 123, 126 and corresponding downlinks 112, 115, 118 preferably is the same for all of the Node Bs/downlinks in order for the data to be soft combined. By using one transport format for all of the Node Bs/downlinks, additional robustness is attained with respect to TFCI detection, essentially providing selection combining gain for the TFCI bits. In one embodiment of the present invention, wherein the TFCI bits are guaranteed to be identical, UE 102 may soft combine the TFCI bits for further gains. However, different downlinks may have different transport format combination sets (TFCS), so it may be difficult to select an identical TFCI and a same transport format combination for all downlinks being soft combined. Therefore, in another embodiment of the present invention, UE 102 may not assume that all downlinks have an identical TFCI and, as a result, may not soft combine the TFCI bits.

An advantage of the 'service specific' embodiment over the 'coverage area specific' embodiment is that communication system 100 may save communication resources, more specifically, code resources, by allowing different Node Bs 120, 123, 126 to provide different services in the same time slots when the services are multiplexed on the same physical channel. A drawback of the 'service specific' embodiment is that it consumes more system overhead than the 'coverage area specific' embodiment when conveying to UE 102 the scheduling information for all of the multiple soft combinable Node Bs 120, 123, 126. However, the overhead consumed by the scheduling information signaling involved in the 'service specific' embodiment is not large, perhaps only a couple of hundred bits per second. For example, a number of bits required to provide 'service specific' scheduling may be determined in accordance with the following equation (in practice, many of the variables will be fixed constants):

$$\left(\sum_{i=1}^{M}\left(\alpha_i + \beta_i + \sum_{j=1}^{N}\delta_{i,j}\right)\right) \times f$$

wherein,

M is an average number of services to be scheduled per modification period;

$\alpha_i$ is a number of bits for start SFN representation, SFN from 0 to 4095, 12 bits;

$\beta_i$ is a number of bits for scheduled duration representation (in radio frames or TTI) and depends on the maximum supported data rate, the scheduling period, TTI length, and spreading factor. Six (6) bits for 1 second scheduling period, 20 ms TTI may suffice;

N is a number of coverage areas or Node Bs, whose multicasts are being soft combined (for MBMS, 10 is a reasonable value);

$\delta_{i,j}$ is a number of bits needed to signal a time difference (in radio frames) between a serving coverage area, or node B, and a neighbor coverage area, or Node B, j for an MBMS service i. Assuming no more than a 1.28 second delay, 7 bits may suffice;

f is an inverse of scheduling period. A reasonable assumption is that the scheduling period is the same as the modification period (around 5 s), so a nominal f=0.2.

For example, assuming that N=10, M=10, f=5 s, $\delta_{i,j}$=7, then the overhead is 10*(6+12+10*7)/5=176 bits/second. This overhead may be further reduced by limiting a maximum delay between air interfaces of the various coverage areas, or Node Bs, or by expressing $\delta_{i,j}$ in TTIs instead of radio frames.

In yet another embodiment of the present invention, UE 102 may determine a soft combining start time for each neighbor Node B 120, 126, or associated coverage area, merely based on a soft combining start time of only a single Node B or coverage area, preferably serving Node B 123 or the associated coverage area. MBMS specifications are being developed that require that RAN 140 set the maximum timing difference (as received by the UE) for different downlinks to one (1) TTI plus one (1) slot. As a result, UE 102 may use a start of a soft combining period for the single Node B, such as serving Node B 123 (or associated coverage area or downlink 115), along with the maximum timing difference to determine start times for the soft combining periods of the other soft combinable Node Bs, that is, neighbor Node Bs Node Bs 120 and 126, or associated coverage areas or downlinks 112, 118.

Figure 5:
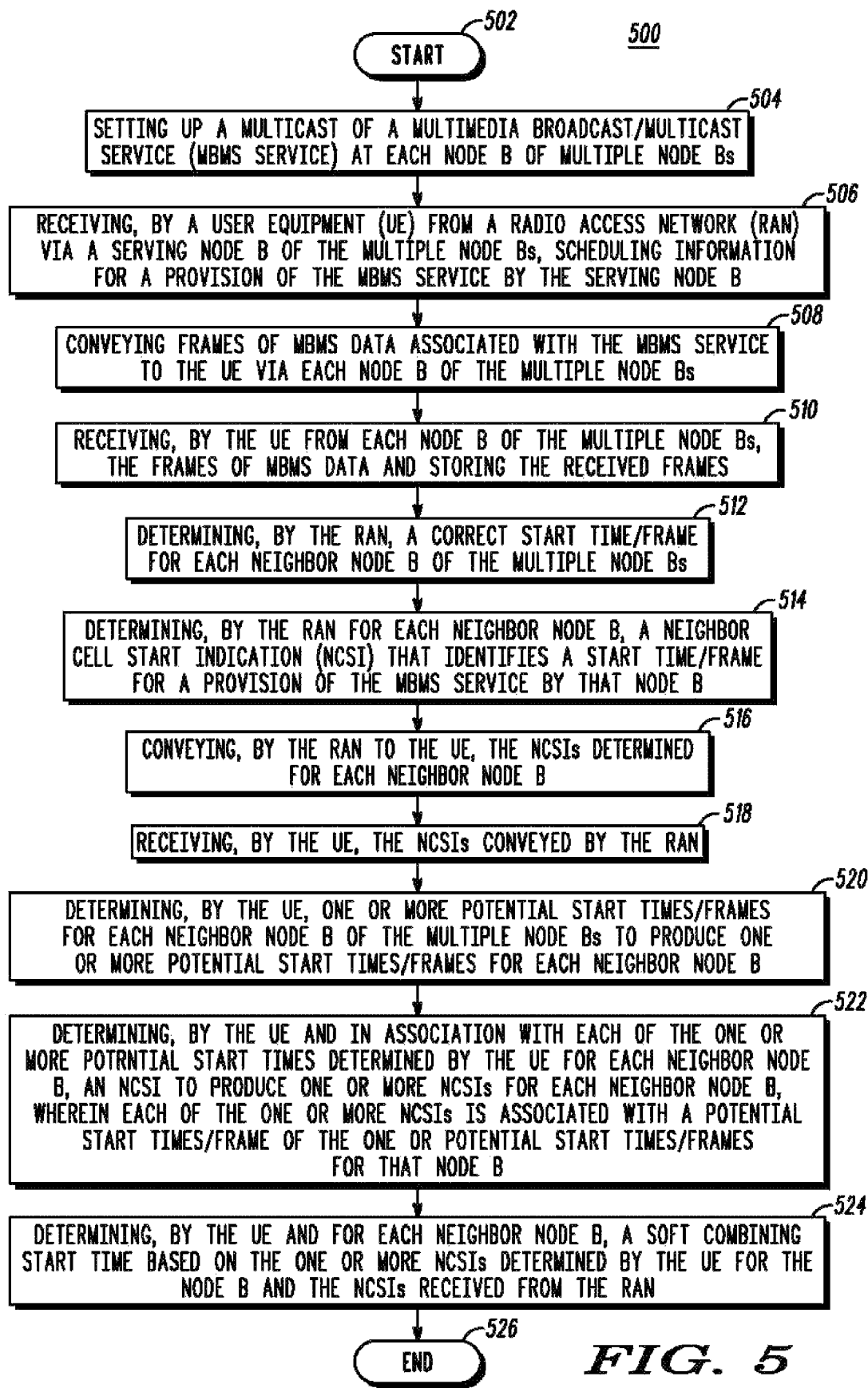
FIG. 5 is a logic flow diagram of a method executed by the communication system of FIG. 1 to determine soft combining start period times associated with each of multiple Node Bs or associated coverage areas or downlinks in accordance with an embodiment of the present invention.

Referring now to FIG. 5, a logic flow diagram 500 is provided of a method executed by UE 102 to determine soft combining start period times for soft combinable neighbor Node Bs, such as Node Bs 120 or 126 (or associated coverage areas or downlinks 112, 118), in accordance with the yet another embodiment of the present invention. Logic flow diagram 500 begins (502) when RAN 104, and more particularly network controller 130, sets up (504) a multicast of an MBMS service at each of Node Bs 120, 123, and 126 and UE 102 receives (506), from network controller 130 via serving Node B 123, scheduling information for provision of the MBMS service by the serving Node B. The scheduling information includes a start time for the service, in radio frames, such as an SFN index or a CFN index, and a scheduling duration, such as a number of radio frames or TTIs, for serving Node B 123.

As part of the MBMS service, RAN 140, and preferably network controller 130, conveys (508) frames of MBMS data associated with the MBMS service to each of Node Bs 120, 123, and 126, and via the Node Bs, to UE 102. When UE 102 receives (510) the frames of MBMS data, the UE stores the received frames in buffer 108 of the UE. In addition, as RAN 140 is aware of, and therefore is able to determine (512), a correct start time, or starting frame, for the frames of MBMS data transmitted by each neighbor Node B 120, 126 to UE 102, then RAN 140, and in particular network controller 130 or the Node B, determines (514), for each neighbor Node B 120, 126, a start time indicator, preferably a neighbor cell start indication (NCSI) for the Node B (and hereinafter referred to as an NCSI), that is directly associated with and identifies a start time, or a starting frame, for the multicast of the MBMS service by that Node B.

In order to limit the size, in terms of bits, of the NCSI, the NCSIs need only differentiate among the potential start times, or frames of MBMS data, that fall within a 'combining window' around the start time on the serving cell. There are a finite number of potential start times within a combining window because the UE must know when a new block of data will be transmitted. In order to allow the UE to know when the new block of data will be transmitted, the W-CDMA standard indicates the time period over which a block of data will be transmitted (which is called a transmission time interval or "TTI"), and only allows each block of data on a given transport channel to begin on a radio frame that is an even multiple of the number of radio frames in a TTI. The 'combining window' is window of time, or frames, that is, at the largest, plus/minus one (1) TTI plus one slot from the start time of the MBMS service as provided in the scheduling information by serving Node B 123. As one of ordinary skill in the art is aware (and as is apparent by reference to FIG. 6), at most three (3) potential start times for a neighbor Node B 120, 126 may fall within the 'combining window.' As a result, two bits may be used to represent the NCSI. Since RAN 140 determines an NCSI that maps to an NCSI determined by UE 102 but that is unique for each frame in the 'combining window,' the RAN and UE may use a same algorithm to determine the NCSIs and may further derive the NCSI from information that is unique to each such frame, such as a frame number. For example, RAN 140 may determine the NCSI for each neighboring Node B 120, 126 as follows, neighbor cell start indication=(CFN_Start(i)/{Max_T-TI_Size})mod 4, where CFN_Start(i) is the frame number corresponding to the start time/starting frame, and Max_TTI_Size is the largest TTI on the S-CCPCHs that may be soft combined. Network controller 130 then conveys (516) to UE 102 via serving Node B 123, and the UE receives (518) from the network controller, the NCSI determined for each neighbor Node B 120, 126.

On the UE 102 side, based on the serving Node B scheduling information, more particularly the provided start time, and a largest TTI size used by communication system 100 on the S-CCPCHs that may be soft combined (Max_TTI_Size), the UE determines (520) one or more potential start times, in radio frames, for each soft combinable neighbor Node B 120, 126 (or associated coverage areas or downlink) and in association with the frames received from the Node B to produce one or more potential start times for each neighbor Node B 120, 126. Each potential start time for a neighbor Node B is associated with a frame of MBMS data conveyed by the Node B. For example, the UE may use the constraint that a data block start on a radio frame that is an even multiple of the number of radio frames in a TTI to determine potential start times/frames, so the UE 102 may determine CFNs that fulfill the following equation, CFN mod Max_TTI_Size=0 where 'mod' indicates modulo division.

Due to transmission delays between the serving Node B, that is, Node B 123, and each of the neighbor Node Bs, that is, Node Bs 120 and 126, RAN 140 is likely to determine multiple potential start times for each neighbor Node B. However, by restricting a determination of potential start time for a neighbor Node B 120, 126 to potential start times that lie in a 'combining window' that is, at the largest, plus/minus one (1) TTI from the start time provided by serving Node B 123, a minimal number, that is, at most three (3), potential start times may be determined for each neighbor Node B 120, 126.

UE 102 further determines (522), in association with each of the at least one potential start times determined for each neighbor Node B 120, 123, an NCSI to produce at least one NCSI for each Node B. Preferably, UE 102 uses the same algorithm as RAN 104 in determining the NCSIs so that the determinations are aligned, such as the equation 'neighbor cell start indication=(CFN_Start(i)/{Max_TTI_Size})mod 4.'

For each neighbor Node B 120, 126, UE 102 then determines (524) a soft combining start time by matching one of one or more NCSIs determined by UE 102 in association with each of the one or more potential start times/frames for the Node B and the NCSI for the Node B received from RAN 140. Logic flow 500 then ends (526).

Figure 6:
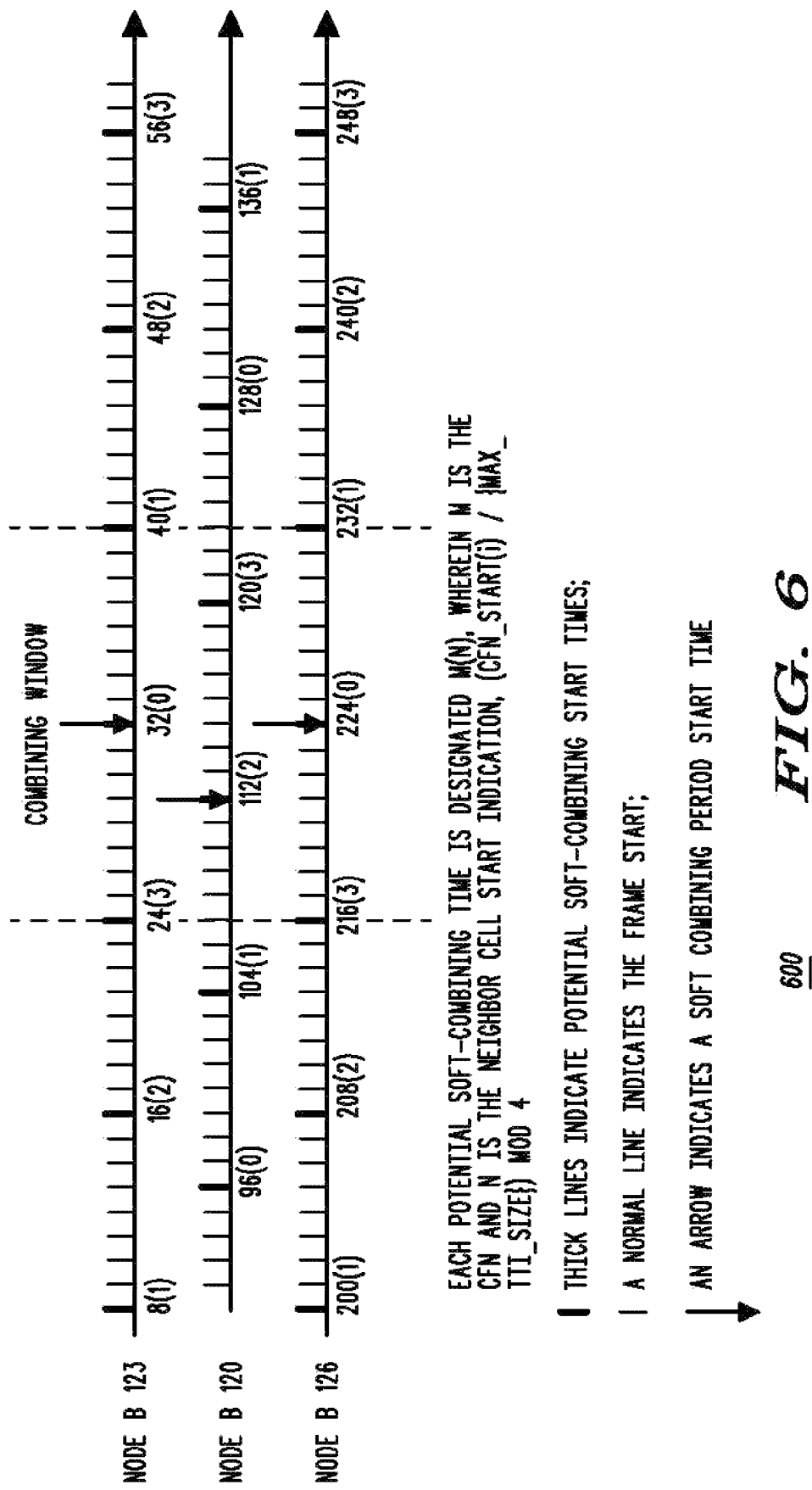
FIG. 6 is an exemplary timing diagram illustrating a detection of a soft combining start time for each of multiple Node Bs or associated coverage areas or downlinks in accordance with an embodiment of the present invention.

In order to assist the reader in understanding the principles of the present invention and not intending to limit the invention in any way, an exemplary timing diagram is provided in FIG. 6 that illustrates a detection of a soft combining start time by a UE, such as UE 102, for each of neighbor Node Bs 120 and 126 (or associated coverage areas or downlinks 112, 118) in accordance with the method described in logic flow diagram 500. In FIG. 6, a Max_TTI_Size=8. In FIG. 6, thick lines indicate potential soft combining start times, thinner lines indicate a start of a frame, and the arrows indicate the soft combining start times for each Node B 120, 123, and 126. Also, in FIG. 6, the potential soft combining start times, or starting frames, as well as non-potential starting frames, are designated as M(N), wherein M corresponds to the radio frame number, preferably the CFN, of the frame, and N is the NCSI calculated for the frame.

As depicted in FIG. 6, with respect to serving Node B 123, the start of the soft combining period is CFN 32. UE 102 knows neighbor Node Bs 120 and 126, that is downlinks 112 and 118, can be soft combined, and can calculate potential soft combining start time for each neighbor Node B or coverage area. Since the network must synchronize soft combinable transmissions to one TTI, UE 102 calculates potential start times within a 'combining window' that is up to 1 TTI earlier and 1 TTI later than the current serving Node B or coverage area.

As depicted in FIG. 6, for Node B 120, potential start times, or frames, 112 and 120 both fall in the combining window. UE 102 calculates an NCSI for each potential start time/frame, with the result that potential start time/frame 112 is associated with an NCSI with a value of '2' and potential start time/frame 120 is associated with an NCSI with a value of '3.' These potential start times/frames for Node B 120 are therefore depicted in FIG. 6 as 112(2) and 120(3).

For Node B 126, one potential start time, or frame, that is, start time/frame 224, exactly matches the start time/frame of serving Node B 123 and as a result, three potential start times, or frames, 216, 224, 232 all fall in the combining window for Node B 123. UE 102 calculates an NCSI for each potential start time/frame, with the result that potential start time/frame 216 is associated with an NCSI with a value of '3,' potential start time/frame 224 is associated with an NCSI with a value of '0,' and potential start time/frame 232 is associated with an NCSI with a value of '1.' These potential start times/frames for Node B 126 are therefore depicted in FIG. 6 as 216(3), 224(0) and 232(1).

In order to resolve uncertainty concerning the correct start time for each of Node B 120 and Node B 126, network controller 130 conveys to UE 102 an NCSI for each such Node B. The NCSI provided by the RAN indicates which of one or more NCSIs determined by the UE for each Node B 120, 126 corresponds to a correct start time. For example, with respect to FIG. 6, network controller 130 will convey to UE 102 an NCSI with a value of '2' for Node B 120 and an NCSI with a value of '0' for Node B 126. By utilizing the NCSIs provided by the RAN, UE 102 is able to determine that the start time/frame for Node B 120 is 112 and that the start time/frame for Node B 126 is 224.

In summarization, communication system 100 provides for a provision, via a single, serving Node B, that is, Node B 123, of all scheduling information required by a UE, that is, UE 102, to determine a start time for all other Node Bs, that is Node Bs 120 and 123, of multiple Node Bs, that is, Node Bs 120, 123, and 126, with respect to a multicast, by each Node B of the multiple Node Bs, of soft combinable MBMS data. By providing all needed scheduling information via a single Node B, the UE only need monitor a single link in order to obtain the scheduling information. Thus the UE is permitted to sleep more and conserve battery power, as independent scheduling on the downlinks associated with each of the multiple Node Bs would cause the UE to wake up more often. The UE may then use the scheduling information to synchronize a soft combining of the MBMS data received by the UE via each of the multiple Node Bs, even when the multicasts via the multiple Node Bs are not synchronized.

In one embodiment of the present invention, a 'coverage area specific,' or 'Node B specific,' embodiment, a transmission delay (or 'offset') between neighboring coverage areas, or Node Bs, is approximately the same regardless of the MBMS service provided. As a result, the scheduling information conveyed to the UE need not include a separate offset for each MBMS service. Instead, a network controller, that is network controller 130, may convey scheduling information the UE that includes a transmission delay for each neighbor Node B of the multiple Node Bs and service scheduling information for each MBMS service. In turn, the service scheduling information for each MBMS service may include a reference start time for the MBMS service and a scheduling duration for the MBMS service.

In another embodiment of the present invention, a 'service specific' embodiment, the transmission delays between the multiple Node Bs may not be the same for all MBMS services. As a result, instead of providing a delay for each neighbor (non-serving) Node B and a single start time and schedule duration for each MBMS service, the network controller may provide service scheduling information that is specific to each soft combinable MBMS service and Node B, which service scheduling information includes a specific start time for each MBMS service at each Node B of the multiple Node Bs. To facilitate soft combining, preferably each Node B of the multiple Node Bs uses a same scheduling duration. As a result, the service scheduling information may further include a specific scheduling duration for each MBMS service at each Node B of the multiple Node Bs or may include only a single scheduling duration for each MBMS service.

In yet another embodiment of the present invention, the network controller may convey scheduling information relating to only a single Node B, the serving Node B, to the UE. Based on the provided scheduling information, the UE is able to determine one or more potential start times for each non-serving Node Bs of the multiple Node Bs. For each non-serving Node B, the network controller further conveys to the UE an identifier (NCSI) of which potential start time of the one or more other potential start time is the correct start time for provision of the MBMS service via that Node B. Based on the received indicators, the UE is able to determine a start time for provision of the MBMS service via each non-serving Node B.

The above embodiments of the present invention do not require that the multicasts of frames of data associated with an MBMS service by different Node Bs 120, 123, 126 be synchronized. That is, based on the scheduling information provided to UE 102, the UE is able to determine a start time of a soft combining period for each of the downlinks 112, 115, 118, and corresponding Node Bs 120, 123, 126. UE 102 may then determine a frame difference, such as an SFN difference or a CFN difference, between two Node Bs whose multicasts may be soft combined and combine the transport blocks received from each Node B based on the SFN difference. Thus UE 102 may simply choose the TTIs from each of multiple downlinks 112, 115, and 118 and corresponding Node Bs 120, 123, and 126 to perform the soft combining based on the scheduling information.

However, in both the 'coverage area specific' and the 'service specific' embodiments, it is preferable that a difference in time between multicasts of a same MBMS frame by different Node Bs be constrained so as to minimize a likelihood that soft combining buffer 108 of UE 102 will not be able to store and soft combine MBMS data received from each of the multiple soft combinable Node Bs 120, 123, and 126. Therefore, communication system 100 further provides for a synchronizing of the multicasts of a same MBMS service by each of soft combinable Node Bs 120, 123, and 126.

Figure 7:
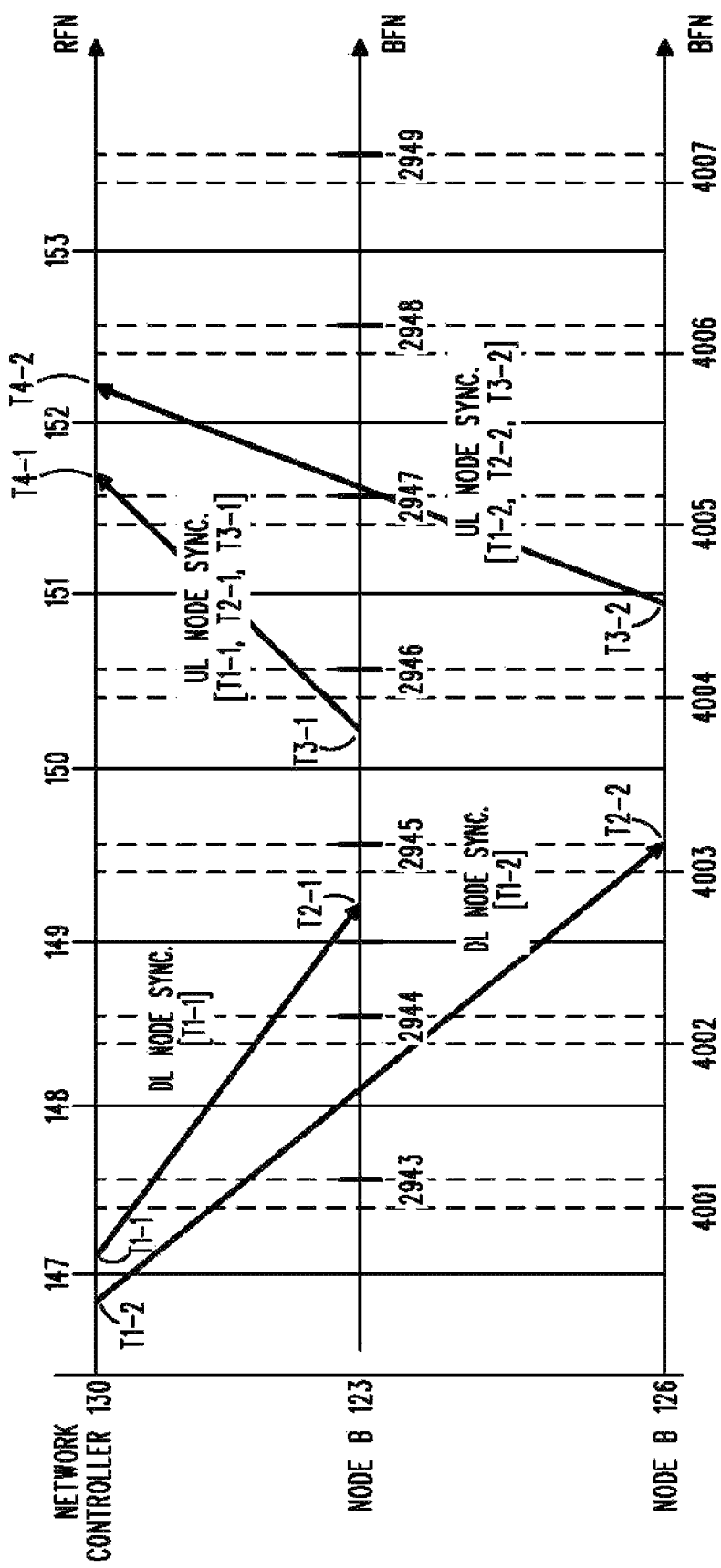
FIG. 7 is an exemplary timing diagram that illustrates a method by which the network controller of FIG. 1 may synchronize multiple Node Bs in accordance with an embodiment of the present invention.
Figure 8:
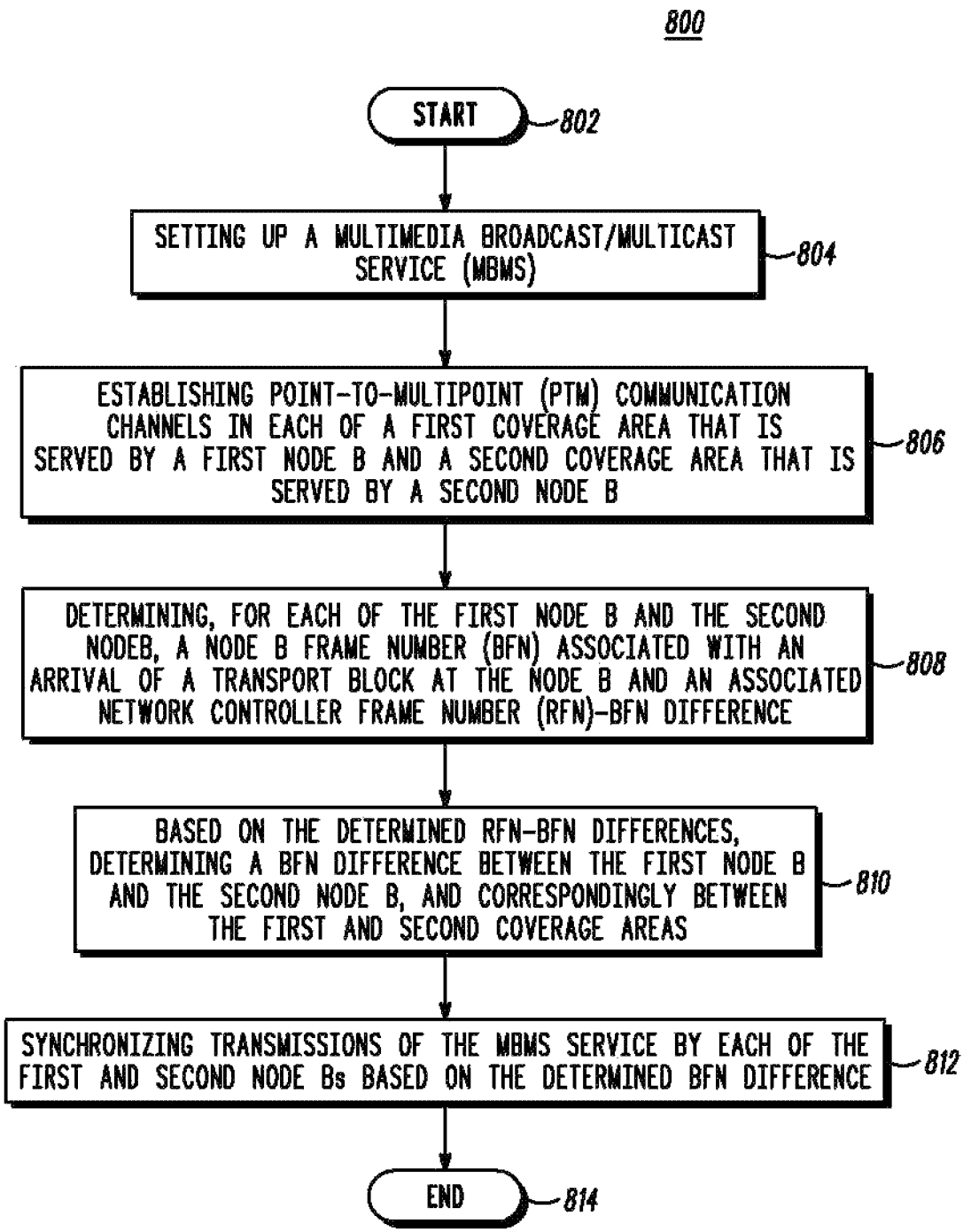
FIG. 8 is a logic flow diagram of a method executed by the network controller of FIG. 1 to synchronize multiple Node Bs in accordance with an embodiment of the present invention.

Referring now to FIGS. 7 and 8, a procedure is illustrated by which network controller 130 measures and synchronizes a frame number difference, such as an SFN difference, between neighboring Node Bs, such s Node Bs 123 and 126, in accordance with an embodiment of the present invention. Preferably, the synchronization is implemented in accordance with a well-defined node synchronization procedures that are described in detail in 3GPP TS 25.402, which specification is hereby incorporated herein in its entirety. By synchronizing, that is, limiting a variability of transmission times, of the multicasts of an MBMS service by each of the neighboring Node Bs 120, 123, 126, network controller 130 is able to assure that the transmission delays, or offsets, between the Node Bs are small enough such that soft combining the transport blocks will not exceed the buffer size of soft combining buffer 108 of UE 102.

FIG. 7 is an exemplary timing diagram 700 that illustrates a method by which a network controller 130 may synchronize multiple Node Bs, such as Node B 123 and Node B 126, in accordance with an embodiment of the present invention. FIG. 8 is a logic flow diagram 800 of the synchronization of the multiple Node Bs by network controller 130 in accordance with an embodiment of the present invention. Logic flow diagram 800 begins (802) when an MBMS service is setup (804) and network controller 130 establishes (806) radio bearers, such as PTM communication channels, in each of a first coverage area that is served by a first Node B, such as Node B 123, and a second coverage area that is served by a second Node B, such as Node B 126. Network controller 130 then performs a node synchronization procedure with Node B 123 and Node B 126.

As part of the synchronization procedure, network controller 130 determines (808), for each of the first Node B, that is, Node B 123, and the second Node B, that is Node B 126, a Node B Frame Number (BFN) associated with an arrival of a transport block at the Node B, which transport block is sent at a certain network controller 130 Frame Number (RFN). This is the RFN–BFN difference, which is also determined by network controller 130 for each of the first and second Node Bs 123, 126. Typically, the RFN–BFN difference is measured using a DL Node Sync control frame. If the control frame is sent over a transport bearer used for an MBMS service, then the RFN–BFN difference would be the same for transport blocks sent over the transport bearer.

For example, as depicted in FIG. 7, network controller 130 obtains the information of frame numbers at points in times T1-1, T2-1, T3-1 and T4-1 for Node B 123. Similarly, network controller 130 obtains the information of frame numbers at points in times T1-2, T2-2, T3-2 and T4-2 for Node B 126. Each of T1, T2, T3, and T4 are measured as a frame number (RFN or BFN) that corresponds to a time increment of 0.125 ms. For example, with respect to Node B 123, T1-1 is assumed to be 1471.125 and T2-1 is assumed to be 29445.625. That is, a transport block sent by network controller 130 with an RFN 1471.125 arrives at Node B 123 at a BFN 29445.625, resulting in a time difference or frame number difference (RFN–BFN difference) of 27974.500. With respect to Node B 126, a transport block that is sent by network controller 130 at T1-2 with an RFN 1467.75 arrives at Node B 126 at T2-2 at a BFN 40030.125. So the RFN–BFN difference with respect to Node B 126 is 38542.375. The RFN–BFN difference may be simplified by converting the units to units of 10 ms. The RFN–BFN difference of Node B 123 is then 2797 and the RFN–BFN difference of Node B 126 is then 3856.

Based on the RFN–BFN differences of each of the first and second Node Bs 123, 126, network controller 130 is able to determine (810) that the BFN difference between the first and second coverage areas, that is, between the transmissions by Node B 123 and transmissions by Node B 126, is 1059. Network controller 130 may then synchronize (812) transmission of an MBMS service by each of first Node B 123 and second Node B 126 based on the determined BFN difference. For example, assume that for the first coverage area or Node B 123, the starting SFN for the MBMS service that is being soft combined is set to X. Network controller 130 then may set the starting SFN for the same service in the second coverage area, that is, at Node B 126, to X+1059. Logic flow 800 then ends (814).

Thus communication system 100 provides for a synchronization, by a UE, of received MBMS data that is multicast to the UE via each of multiple Node Bs so that the UE may soft combine the data and further provides for a synchronization by a network controller of the multicasts of the MBMS data by the multiple Node Bs.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing soft combining scheduling information associated with a Multimedia Broadcast/Multicast Service (MBMS service) comprising:
   setting up, by a network controller, a multicast of the MBMS service at each Node B of a plurality of Node Bs, wherein the plurality of Node Bs comprise a serving Node B and a neighbor Node B;
   determining, by the network controller, a start time for a multicast of the MBMS service by the neighbor Node B;
   determining, by the network controller, an indicator that identifies a specific time as the start time for a multicast of the MBMS service by the neighbor Node B;
   conveying, by the network controller, a Transmission Time Interval size of a transmission that may be soft combined to a user equipment via the serving Node B; and
   conveying, by the network controller, the indicator to a user equipment via the serving Node B.

2. The method of claim 1, further comprising conveying, by the network controller, an indication of a start time of the MBMS service on the serving Node B to a user equipment via the serving Node B.

3. The method of claim 1, wherein the indicator that identifies a specific start time is determined in association with the start time.

4. The method of claim 1, wherein the indicator that identifies a specific start time is determined in association with the start time and a maximum Transmission Time Interval size.

5. The method of claim 1, further comprising:
   receiving, by the user equipment, the indicator and the Transmission Time Interval (TTI) size; and
   determining, by the user equipment, a start time and the TTI size for the neighbor Node B based on the received indicator and the TTI size.

6. The method of claim 5, wherein determining, by the user equipment (UE), a start time for the neighbor Node B comprises:
   determining a maximum Transmission Time Interval (TTI) size of TTI sizes of transmissions that may be soft combined;
   determining a potential start time for the neighbor Node B based on the maximum TTI size;
   determining, in association with the potential start time, a start time indicator; and
   determining a start time for the neighbor Node B based on the start time indicator determined by the UE and the start time indicator received by the UE.

7. The method of claim 6, wherein determining a start time for the neighbor Node B comprises matching the start time indicator received by the user equipment (UE) with a start time indicator of the plurality of start time indicators determined by the UE.

8. The method of claim 1, wherein the start time indicator is derivative of information that identifies a starting frame.

9. A method for determining a start time for a multicast of a Multimedia Broadcast/Multicast Service (MBMS service) comprising:
   receiving, by a user equipment, via a serving Node B, an indicator that identifies a specific time as a start time for a multicast of the MBMS service by a neighbor Node B and a Transmission Time Interval (TTI) size; and
   determining, by the user equipment, a start time and a TTI size for the neighbor Node B based on the received indicator and the TTI size.

10. The method of claim 9, wherein determining a start time for the neighbor Node B comprises:
   determining a maximum TTI size of TTI sizes of transmissions that may be soft combined;
   determining a potential start time for the neighbor Node B based on the maximum TTI size;
   determining, in association with the potential start time, a start time indicator; and
   determining a start time for the neighbor Node B based on the start time indicator determined by the UE and the start time indicator received by the UE.

11. The method of claim 10, wherein determining a start time for the neighbor Node B comprises matching the start time indicator received by the user equipment (UE) with the start time indicator determined by the UE.

12. The method of claim 9, wherein the start time indicator is derivative of information that identifies a starting frame.

13. A network controller, comprising a processor, that provides scheduling information associated with a Multimedia Broadcast/Multicast Service (MBMS service), wherein the processor is configured to set up a multicast of the MBMS service at each Node B of a plurality of Node Bs, wherein the plurality of Node Bs comprise a serving Node B and a neighbor Node B, determine a start time for the neighbor Node B, determine, in association with the start time, a start time indicator, wherein the start time indicator corresponds to a starting frame, convey a Transmission Time Interval size of a transmission that may be soft combined to a user equipment via the serving Node B, and convey the start time indicator to a user equipment via the serving Node B.

14. The network controller of claim 13, wherein the network controller is further configured to convey an indication of a start time of the MBMS service on the serving Node B to the user equipment via the serving Node B.

15. The network controller of claim 13, wherein the start time indicator that identifies a specific start time is determined in association with the start time.

16. The network controller of claim 13, wherein the start time indicator that identifies a specific start time is determined in association with the start time and a maximum Transmission Time Interval size.

17. The network controller of claim 13, wherein the start time indicator is derivative of information that identifies the starting frame.

18. A user equipment for determining a start time for a multicast of a Multimedia Broadcast/Multicast Service (MBMS service), wherein the user equipment comprises a processor that is configured to receive, via a serving Node B, an indicator that identifies a specific time as a start time for a multicast of the MBMS service by a neighbor Node B and a Transmission Time Interval (TTI) size and to determine a start time and a TTI size for the neighbor Node B based on the received indicator and the TTI size.

* * * * *